United States Patent
McCall

(10) Patent No.: US 6,881,174 B2
(45) Date of Patent: Apr. 19, 2005

(54) OVER-RIDE OF DRIVER DEMAND IN A MOTOR VEHICLE

(75) Inventor: Gavin Frasier McCall, Witham (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/649,020

(22) Filed: Aug. 27, 2003

(65) Prior Publication Data

US 2004/0127333 A1 Jul. 1, 2004

(30) Foreign Application Priority Data

Aug. 31, 2002 (GB) .............................................. 0220284

(51) Int. Cl.$^7$ .............................................. B60K 41/20
(52) U.S. Cl. ...................................................... 477/107
(58) Field of Search ................................ 477/107, 183, 477/184, 185, 186, 187, 203

(56) References Cited

U.S. PATENT DOCUMENTS 5,022,286 A * 6/1991 Takizawa .................... 477/119
5,150,681 A 9/1992 Kull et al.
5,161,432 A * 11/1992 Matsumoto et al. ........ 477/119
6,352,061 B1 * 3/2002 Takahashi ................... 477/107

FOREIGN PATENT DOCUMENTS

| GB | 2 319 635 | 5/1998 |
| GB | 2 325 060 | 11/1998 |
| JP | 11-270371 | * 10/1999 |

* cited by examiner

Primary Examiner—Ha Ho
(74) Attorney, Agent, or Firm—Brinks Hofer Gilson & Lione

(57) ABSTRACT

The over-ride of driver demand in a motor vehicle when the driver activates, at the same time, both the brake pedal and the accelerator pedal. The system comprises an engine control unit for controlling the engine, a driver accelerator control and a driver braking control. The accelerator and braking controls provide to the engine control unit, respectively, a driver demand signal and a braking demand signal that indicate, respectively, the level of driver engine demand and the level of driver braking demand. The engine control unit over-rides the driver demand signal to reduce engine power when, after a predetermined delay, both the driver demand signal and the braking demand signal are above predetermined levels of driver engine demand and driver braking demand.

13 Claims, 3 Drawing Sheets

OVER-RIDE OF DRIVER DEMAND IN A MOTOR VEHICLE

BACKGROUND

1. Field of the Invention

The present invention relates to the over-ride of a driver demand in a motor vehicle, particularly when the driver activates at the same time both the brake pedal and the accelerator pedal.

2. Related Art

A motor vehicle driver controls the speed of a conventional vehicle using foot pedals, which in a vehicle with an automatic transmission are the accelerator pedal and brake pedal and, in a vehicle with a manual transmission, also the clutch pedal. Drivers will normally use the same foot to control both the accelerator pedal and the brake pedal.

However, some drivers of automatic transmission vehicles use two feet, one to control the accelerator pedal and the other to control the brake pedal. This can result in simultaneous activation of both the vehicle brake and accelerator, which can result in brake overheating or undue wear, as well as causing a potential safety problem owing to constant activation of the brake lights when the vehicle is actually not slowing down. As a result it has been proposed to monitor the brake and accelerator pedals to detect simultaneous operation of both these pedals and to reduce or cut the driver demand to the engine when simultaneous operation has been detected.

The present inventors have realized, however, that there are times when the driver may be activating both pedals at the same time in such a way that would not give rise to the aforementioned problems of brake wear or brake light safety. For example, there is a style of sport driving in manual transmission vehicles called "heal-toe" driving, in which the driver when braking with one foot and activating the clutch with the other foot for a gear change, also uses the one foot to rev the engine above its idle speed. This may be necessary in off-road rally driving to avoid slippage of the driving wheel when a lower gear is activated.

Another situation in which simultaneous activation of the brake and accelerator may be acceptable is when a two-footed driver lightly rests one foot on the accelerator while using the other foot to brake the vehicle. The driver demand may cause the engine speed to rise above the idle speed, but there may be no problem as long as the engine speed remains within acceptable limits and as long as there is no unequal braking of the wheels.

SUMMARY OF THE INVENTION

It is an object of the present invention to provide a more convenient system and method for controlling the over-ride of driver demand in a motor vehicle when the driver activates, at the same time, both the brake pedal and the accelerator pedal.

According to the invention, there is provided a control system for a motor vehicle having an engine, engine control unit for controlling the engine, a driver accelerator control, and a driver braking control, said controls providing to the engine control unit, respectively, a driver demand signal and a braking demand signal that indicate respectively the level of driver engine demand and the level of driver braking demand. The engine control unit may be an integrated unit, or may equivalently be distributed amongst electronic units throughout a motor vehicle, and being arranged to:

a) calculating a first delay following the time at which the driver demand signal indicates a level of driver engine demand above said first predetermined level of driver braking demand;
b) calculating a second delay following the time at which the braking demand signal indicted a level of driver braking demand above said first predetermined level of driver braking demand;
c) determining a predetermined delay, the predetermined delay being the later of the first delay and the second delay; and
d) over-riding the driver demand signal to reduce engine power if, after the predetermined delay, both the driver demand signal and the braking demand signal have risen above predetermined levels of driver engine demand and the driver braking demand.

In one preferred embodiment of the invention, there is more than one such predetermined delay, and accordingly a predetermined delay of this type mentioned above will be referred to hereinafter as the first predetermined delay.

Also according to the invention, there is provided a method of controlling the engine of a motor vehicle, the vehicle including an engine control unit, a driver accelerator control and a driver braking control, the method comprising the steps of:

i) using the driver accelerator control to provide to the engine control unit a driver demand signal that indicates the level of driver engine demand;
ii) using the driver braking control to provide to the engine control unit a braking demand signal that indicates the level of driver braking demand;
iii) using the engine control unit to monitor both the driver demand signal and the driver braking demand signal;
iv) calculating a first delay following the time at which the driver demand signal indicates a level of driver engine demand above said first predetermined level of driver engine demand;
v) calculating a second delay following the time at which the braking demand signal indicates a level of driver braking demand above said first predetermined level of drive braking demand;
vi) determining a first predetermined delay, the first predetermined delay being the later of the first delay and the second delay; and
vii) using the engine control unit to over-ride the driver demand signal to reduce engine power if, after the first predetermined delay, both the driver demand signal and the braking demand signal have risen above the first predetermined level of driver engine demand and a first predetermined level of driver braking demand.

The first predetermined delay is then the longer acting of the first delay and the second delay in any particular circumstance.

The first predetermined delay allows both the driver demand signal and the braking demand signal to rise above the respective predetermined levels for a time within the first predetermined delay. Therefore, a driver may activate both the brake and the accelerator together at least during this delay period. Thereafter, the engine control unit over-rides the driver engine signal to provide a reduced level of engine demand.

In the simplest embodiment of the invention, the first predetermined level of driver engine demand is a zero level, for example, a level corresponding with an idle speed. Similarly, the first predetermined level of driver braking demand may also be a zero level.

The predetermined levels may, however, be higher than a zero level, for example at a level up to 10% above a zero level as compared with a full value for the demand. In such a system, a driver may be able to rest his foot lightly on a brake pedal or an accelerator pedal indefinitely.

It has been found that if the first delay is between 0.5 s and 1.5 s, then heel-toe driving is possible. Similarly, the second delay may be between 0.5 s and 1.5 s. In addition, if a driver rests a foot on the accelerator pedal while braking, the driver demand is not immediately restricted, but will be after the first predetermined delay has passed.

Also in a preferred embodiment of the invention, in step vii) the over-ride of the driver demand signal continues at least until both the driver demand signal and the braking demand signal have fallen below a second predetermined level of driver engine demand and a second predetermined level of driver braking demand.

It is also helpful in step vii) of the method, if the over-ride of the driver demand signal continues for a second predetermined delay after both the driver demand signal and the braking demand signal have fallen below said second predetermined levels. The second predetermined delay is preferably less than the first predetermined delay, so that the vehicle actual driver demand returns quickly to the level required by the driver. The second delay can be useful in allowing a smooth transition between the over-ride of the driver demand and the return to the driver demand required by the driver.

In the simplest embodiment of the invention, the second predetermined level of driver engine demand is a zero level, for example, a level corresponding with an idle speed. Similarly, the first predetermined level of driver braking demand may also be a zero level. The predetermined levels may, however, be higher than a zero level, for example at a level up to 10% above a zero level as compared with a full value for the demand.

The second predetermine delay can be calculated in a manner similar to that for the first predetermined delay. For example, the method may comprise the steps of:

vii) calculating a third delay following the time at which the driver demand signal indicates a level of driver engine demand below said second predetermined level of driver engine demand;

viii) calculating a fourth delay following the time at which the braking demand signal indicates a level of driver braking demand below said second predetermined level of driver braking demand; and ix) the second predetermined delay then being the later of the third delay and the fourth delay.

In a preferred embodiment of the invention, the second predetermined delay is always shorter than the first predetermined delay, so that the actual engine demand returns quickly to the engine demand required by the driver. Preferably, the third delay is between 0.1 s and 0.5 s. Similarly, the fourth delay is between 0.1 s and 0.5 s.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

The invention will be further described, by way of example only, and with reference to the accompanying drawings, in which.

DETAILED DESCRIPTION

Figure 1:
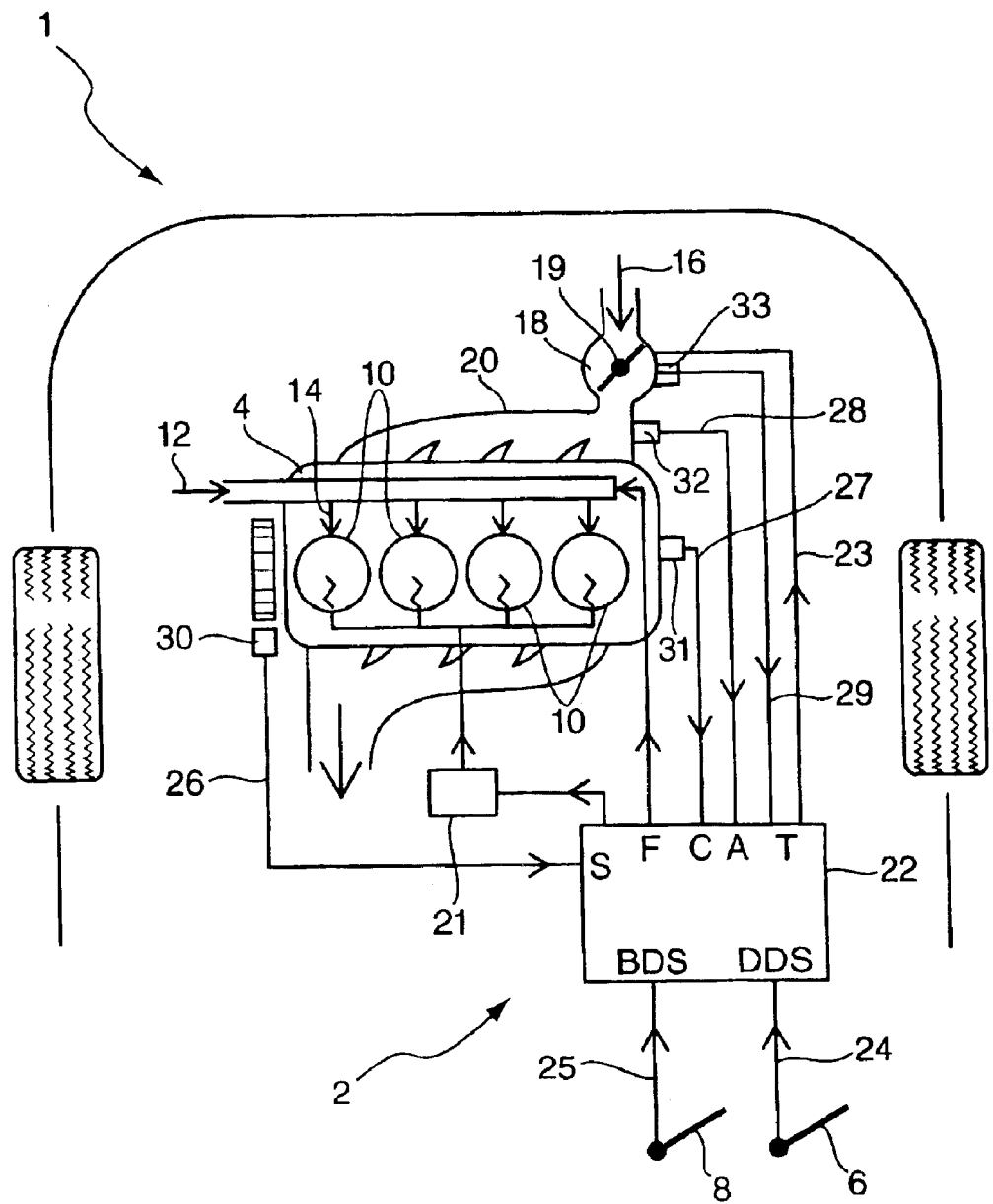
FIG. 1 is a schematic diagram of a control system according to the invention for a motor vehicle with an internal combustion engine, having an engine control unit (ECU) that receives as inputs a driver demand signal and a braking demand signal.

FIG. 1 shows schematically a motor vehicle 1 having a control system 2 for controlling the power of an internal combustion engine 4 when an accelerator pedal 6 and a brake pedal 8 are activated at the same time by a driver.

The engine 2 has cylinders 10, four being shown, each of which is supplied with fuel 12 from a fuel injector 14 and with air 16 via an inlet manifold 20. If the engine 4 is a gasoline engine, then the engine will also include a throttle 18, which is here an electronic throttle, and a spark ignition system 21.

The accelerator pedal 6 and brake pedal 8 provide respectively a driver demand signal 24 and a braking demand signal 25 to an engine control unit (ECU) 22, which is used to control the operation of the engine 4. The ECU 22 also receives inputs from a number of other sensors, including an engine speed signal (S) 26 from an engine speed sensor 30, an engine temperature signal (C) 27 from an engine temperature sensor 31, and an air flow signal (A) 28 from an inlet air mass airflow sensor 32.

The electronic throttle 18 receives a control signal 23 from the ECU 22 and optionally also sends via a throttle position sensor 33 a signal (T) 29 to the ECU indicative of the position of a throttle flap 19.

The invention will now be further described with reference also to FIG. 2, which shows an example of a driver demand signal (DDS) 124 and a braking demand signal (BDS) 125, which overlap in time. The driver demand signal 124 is initially zero, indicating that the driver is not pressing on the accelerator pedal 6. At a time $t_1$ the driver demand signal starts to rise. The ECU 22, which is monitoring both the driver demand signal 124 and the braking demand signal 125, notes this rise and begins to time a first delay ($\Delta t_1$) 40. If after the first delay 40 the driver demand signal 124 is still above zero, the ECU 22 changes an internal logic value, "sustained driver demand" 41 (SDD) from zero to one, indicating that there is a sustained driver demand.

Figure 2:
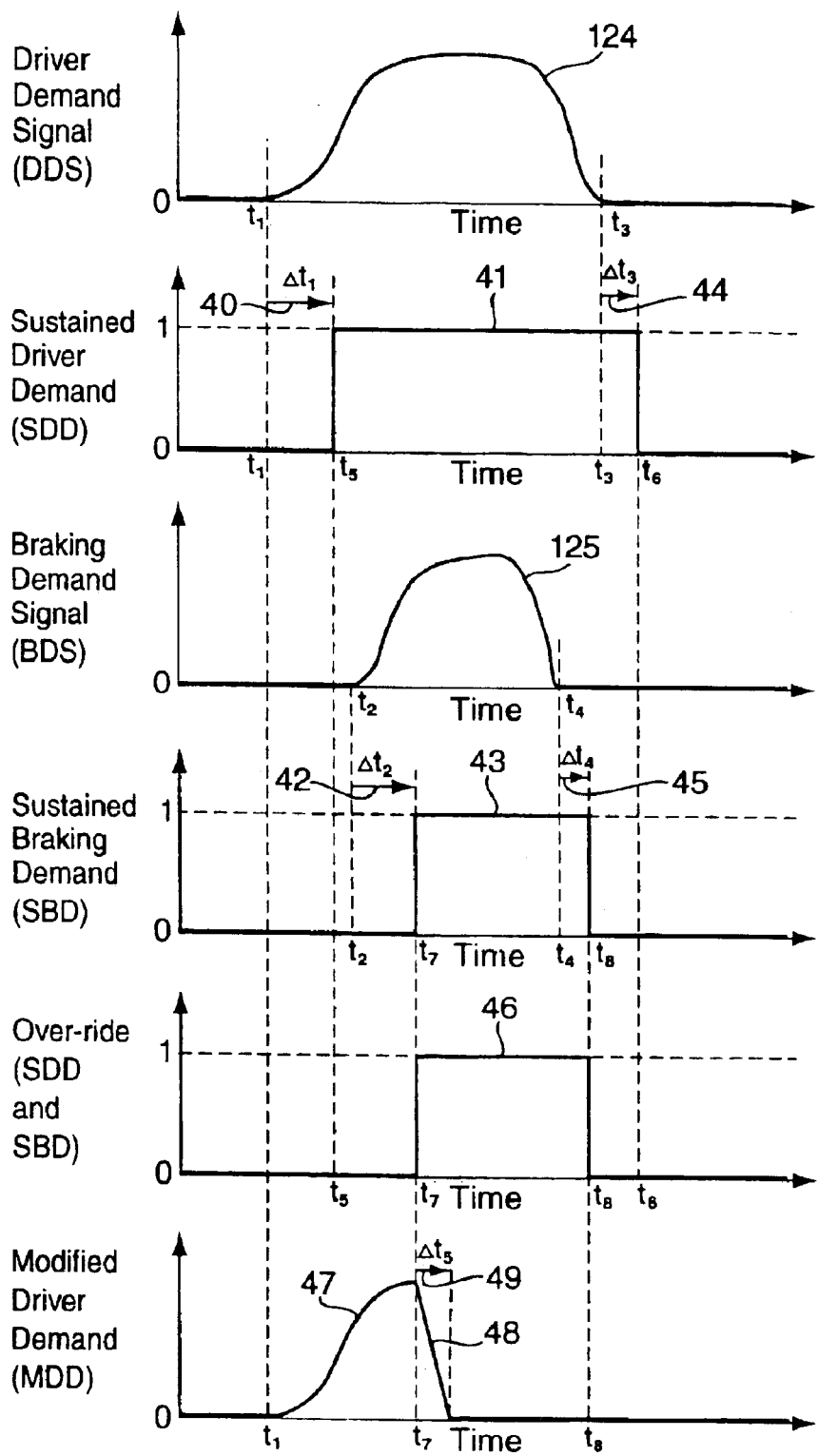
FIGS. 2 and 3 show plots of the driver demand signal and braking demand signal, and how these are processed according to the invention using the engine control unit of FIG. 1.

In the example shown in FIG. 2, the driver then at time $t_2$ begins to activate the brake pedal 8, which causes a rise above zero in the braking demand signal 125. The ECU 22 notes this rise and begins to time a second delay ($\Delta t_2$) 42. If after the second delay 42 the braking demand signal 125 is still above zero, the ECU 22 changes an internal logic value, "sustained braking demand" 43 (SBD) from zero to one, indicating that there is a sustained braking demand. In this example, the first and second delays 40, 42 are both 1 s in length.

The ECU 22 also notes when the driver demand signal 124 and the braking demand signal 125 return to zero at, respectively, times $t_3$ and $t_4$. Again, the ECU 22 times respective third and fourth delays 44,45 ($\Delta t_3$ and $\Delta t_4$) following times $t_3$ and $t_4$ after which the sustained driver demand 41 and sustained braking demand 43 both return to a logical zero, indicating respectively that there is no sustained driver demand or braking demand. In this example, the third and fourth delays 44, 45 are both 0.5 s in length.

As shown in the drawing, the sustained driver demand 41 begins at a time $t_5$ which lies between time the $t_1$ at which the driver demand 124 rises above zero and the time $t_2$ at which the braking demand 125 rises above zero, and ends at a time $t_6$, which is after the time $t_3$ at which the driver demand 124 falls back to zero. The sustained braking demand 43 begins at a time $t_7$ which lies after the time $t_2$ at which the braking demand 125 rises above zero, and ends at a time $t_8$, which is between the time $t_4$ at which the braking demand 125 falls to zero and the time $t_3$ at which the driver demand 124 falls to zero.

FIG. 2 shows how the sustained driver demand (SDD) 41 and the sustained braking demand (SBD) 43 are combined by the ECU 22 in a logical AND operation to create a resultant "over-ride" logical value 46, which is a logical one when both the sustained driver demand 41 and the sustained braking demand 43 are logical ones, and which is a logical zero otherwise. In the example of FIG. 2, the time span of the sustained braking demand 43 falls entirely within the time span of the sustained driver demand 41, and so the time span over which the over-ride value 46 is one is between the times $t_7$ and $t_8$.

The ECU 22 then creates a modified original driver demand (MDD) 47 which in its simplest form is just the original driver demand signal 124 multiplied by the inverse of the over-ride logical value 46. In the present example, however, it is preferred if the transitions between over-ridden and non-over-ridden driver demand are smoothed, in order to provide a more gradual change in the actual engine demand experienced by the driver. This gives the driver time to modify his actuation of the accelerator and brake pedals in the event that he has inadvertently activated both at the same time. In FIG. 2, the smoothed transition is a linear ramp 48 that extends over a time period ($\Delta t_5$) 49 of the order of 1 s. Thereafter, the modified driver demand 47 remains at zero until at the over-ride logical value 46 returns to zero.

However, by the time $t_8$ at which the over-ride logical value 46 has returned to zero, the driver demand signal 124 has already returned to zero, and so the modified driver demand 47 remains at zero following time $t_8$.

Figure 3:
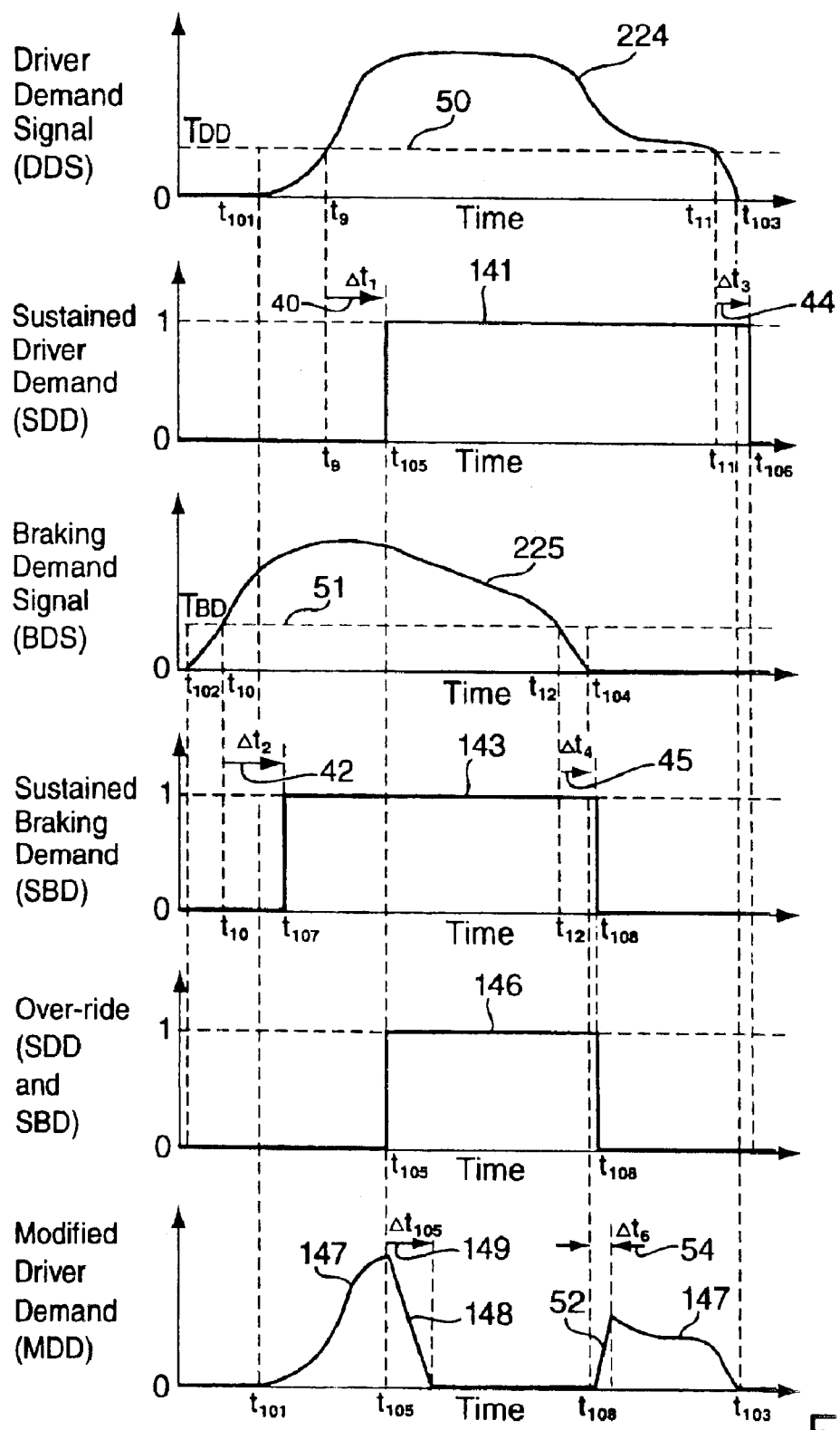

FIG. 3 shows schematically another example in which a driver demand signal (DDS) 224 and a braking demand signal (BDS) 225 overlap in time. Features which are the same as those of FIG. 2 are indicated with same symbols and reference numerals and features that correspond with those of FIG. 2 are indicated by reference numerals incremented by 100.

The example of FIG. 3 is the same conceptually as that of FIG. 2, except that here the ECU 22 monitors the driver demand signal 224 with respect to respective thresholds ($T_{DD}$ and $T_{BB}$) 50,51. The sustained driver demand (SDD) 141 therefore does not rise from a logical zero to a logical one until after the first time delay ($\Delta t_1$) 40 starting at a time $t_9$ following the rise of the driver demand signal 224 above the driver demand threshold 50. Similarly, the sustained braking demand (SBD) 143 does not rise from a logical zero to a logical one until after the second time delay ($\Delta t_2$) 42 starting at a time $t_{10}$ following the rise of the driver braking signal 224 above the braking demand threshold 51.

The ECU 22 also notes when the driver demand signal 224 and the braking demand signal 225 return below the respective thresholds 50,51 at, respectively, times $t_{11}$ and $t_{12}$. Again, the ECU 22 times the respective third and fourth delays 44,45 ($\Delta t_3$ and $\Delta t_4$) following times $t_{11}$ and $t_{12}$ after which the sustained deriver demand 141 and sustained braking demand 143 both return to a logical zero, indicating respectively that there is no sustained driver demand above the driver demand threshold 50 or braking demand above the braking demand threshold 51.

During the calculation of the sustained driver demand 141 and sustained braking demand 143, the ECU 22 calculates an over-ride logical value 146, which is one if both the sustained driver demand 141 and the sustained braking demand 143 are one, and which is zero otherwise. Here the over-ride logical value 146 is one between a start time which happens here to be defined by the start time $t_{105}$ of the sustained driver demand 141, and an end time defined here by the end time $t_{108}$ of the sustained braking demand 143.

The ECU 22 then creates a modified driver demand (MDD) 147 which, as before, is the original driver demand signal 224 multiplied by the inverse of the over-ride logical value 146. When the over-ride value 146 changes, the ECU 22 also applies smoothing to any required change in the modified driver demand 147. In the example of FIG. 3, this smoothing results in a falling ramp 148 that lasts for a time $\Delta t_{105}$ starting at time $t_{105}$ after the initial change in the over-ride value 146 from zero to one. Similarly, a rising ramp 52 is applied that lasts for a time ($\Delta t_6$) 54 starting at time $t_{108}$ following the change in the over-ride value 146 from one to zero. The ramps each change the modified driver demand 147 at a constant rate, with the rate of the falling ramp 148 being less than the rate of the rising ramp 52. The length in time 149,54 of the ramps 148,52 therefore depends on the magnitude of the required change in the modified driver demand 147, but will normally be between 0.1 and 1.0 s.

Although in this example, the driver demand threshold and braking demand threshold are shown as being constant, it will normally be the case that some hysteresis is applied to the detection of zero and non-zero threshold crossings to prevent the ECU from unnecessarily resetting the timing of the first and second delays when the driver demand and braking demand is varying slightly about the threshold. One way of doing this is to use a rising threshold which is above a falling threshold.

The advantage of a system having non-zero thresholds is that this allows a driver indefinitely to rest a foot lightly on either the brake pedal or the accelerator pedal, without the system then over-riding the driver demand, thereby allowing the driver to use heel-toe driving, even after a period in which both pedals have been no more than lightly pressed.

The invention therefore provides a convenient system and method for controlling the over-ride of driver demand in a motor vehicle, when the driver activates at the same time both the brake pedal and the accelerator pedal.

It is to be recognized that various alterations, modifications, and/or additions may be introduced into the constructions and arrangements of parts described above without departing from the spirit or scope of the present invention, as defined by the appended claims.

What is claimed is:

1. A control system for a motor vehicle having an engine comprising:

an engine control unit for controlling the engine;

a driver accelerator control;

a driver braking control;

said driver accelerator control and said driver braking control providing to the engine control unit, respectively, a driver demand signal and a braking demand signal that indicate, respectively, a level of driver engine demand and a level of driver braking demand, the engine control unit being arranged to:

a) calculate a first delay following the time at which the driver demand signal indicates a level of driver engine demand above a first predetermined level of driver engine demand;

b) calculate a second delay following the time at which the braking demand signal indicates a level of driver braking demand above a first predetermined level of driver braking demand;

c) determine a predetermined delay, the predetermined delay being the later of the first delay and the second delay; and d) over-ride the driver demand signal to reduce engine power when, after the predetermined delay, both the driver demand signal and the braking demand signal are above the predetermined levels of driver engine demand and driver braking demand.

2. A method of controlling the engine of a motor vehicle having an engine control unit, a driver accelerator control and a driver braking control, the method comprising the steps of:

i) using the driver accelerator control to provide to the engine control unit a driver demand signal that indicates a level of driver engine demand;

ii) using the driver braking control to provide to the engine control unit a braking demand signal that indicates a level of driver braking demand;

iii) using the engine control unit to monitor both the driver demand signal and the driver braking demand signal;

iv) calculating a first delay following the time at which the driver demand signal indicates a level of driver engine demand above a first predetermined level of driver engine demand;

v) calculating a second delay following the time at which the braking demand signal indicates a level of driver braking demand above a first predetermined level of driver braking demand;

vi) determining a first predetermined delay, the first predetermined delay being the later of the first delay and the second delay; and vii) over-riding the driver demand signal to reduce engine power when, after the first predetermined delay, both the driver demand signal and the braking demand signal are above the first predetermined level of driver engine demand and the first predetermined level of driver braking demand.

3. The method of claim 2, in which the first predetermined level of driver engine demand is a zero level.

4. The method of claim 2, in which the first predetermined level of driver braking demand is a zero level.

5. The method of claim 2, in which the first delay is between 0.5 s and 1.5 s.

6. The method of claim 2, in which the second delay is between 0.5 s and 1.5 s.

7. The method of claim 2, in which in step vii) the over-riding of the driver demand signal continues at least until both the driver demand signal and the braking demand signal have fallen below a second predetermined level of driver engine demand and a second predetermined level of driver braking demand.

8. The method of claim 7, in which in step vii) the over-riding of the driver demand signal continues for a second predetermined delay after both the driver demand signal and the braking demand signal have fallen below said second predetermined levels.

9. The method of claim 7, in which the second predetermined level of driver engine demand is a zero level.

10. The method of claim 7, in which the second predetermined level of driver braking demand is a zero level.

11. The method of claim 7, in which the method comprises the steps of:

viii) calculating a third delay following the time at which the driver demand signal indicates a level of driver engine demand below said second predetermined level of driver engine demand;

ix) calculating a fourth delay following the time at which the braking demand signal indicates a level of driver braking demand below said second predetermined level of driver braking demand, said second predetermined delay being the later of the third delay and the fourth delay.

12. The method of claim 11, in which the third delay is between 0.1 s and 0.5 s.

13. The method of claim 11, in which the fourth delay is between 0.1 s and 0.5 s.

* * * * *